No. 777,640.

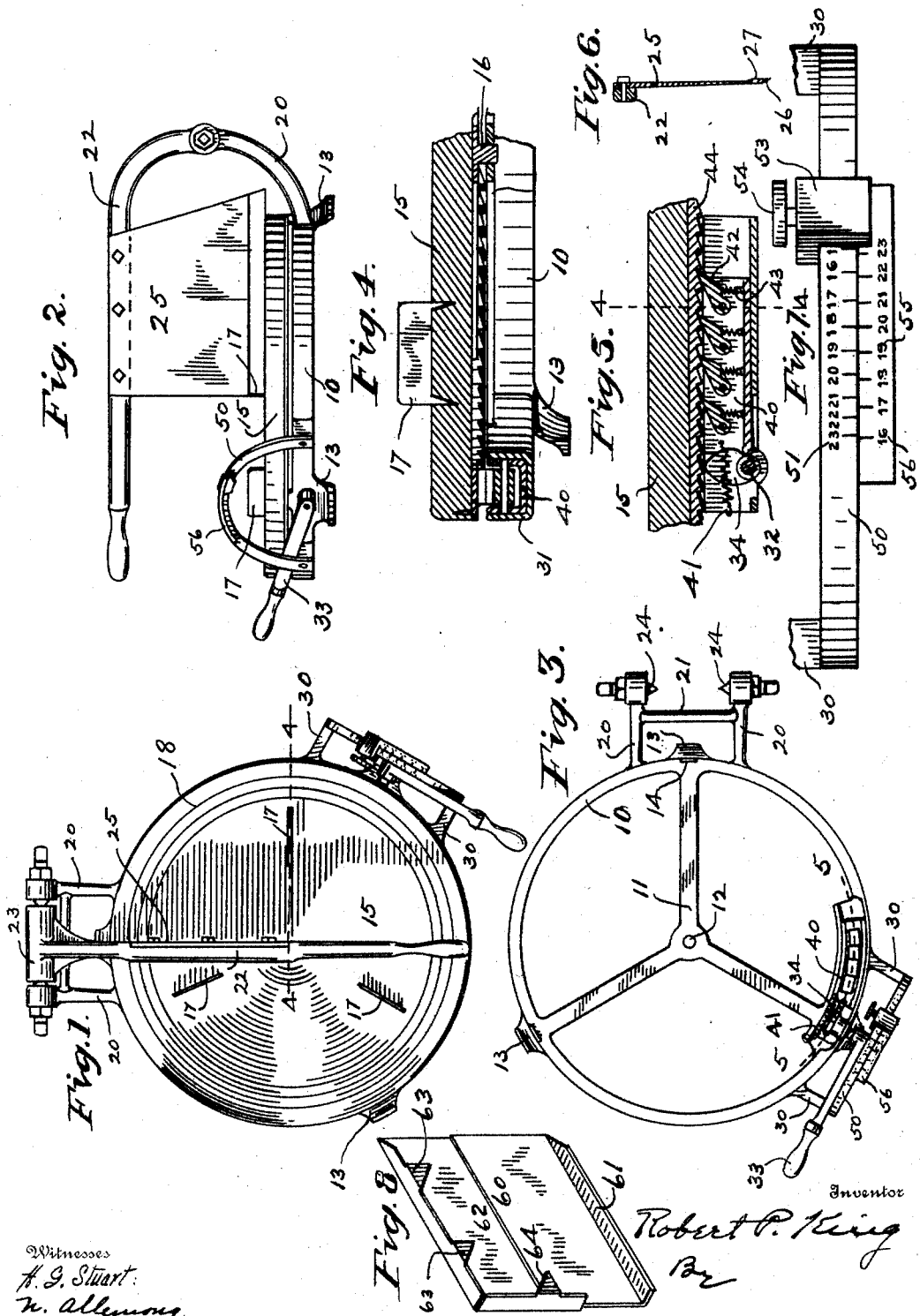

Patented December 13, 1904.

UNITED STATES PATENT OFFICE.

ROBERT P. KING, OF INDIANAPOLIS, INDIANA, ASSIGNOR TO CHARLES W. BRIDGES, OF INDIANAPOLIS, INDIANA.

CHEESE-CUTTER.

SPECIFICATION forming part of Letters Patent No. 777,640, dated December 13, 1904.

Application filed November 27, 1903. Serial No. 182,735. (No model.)

*To all whom it may concern:*

Be it known that I, ROBERT P. KING, of Indianapolis, county of Marion, and State of Indiana, have invented a certain new and useful Cheese-Cutter; and I do hereby declare that the following is a full, clear, and exact description thereof, reference being had to the accompanying drawings, in which like numerals refer to like parts.
The object of this invention is to provide an improved means for cutting cheese, and especially predetermining the size and weight of slice for a certain price.

The full nature of said invention will be understood from the accompanying drawings and the following description and claims.

In the drawings, Figure 1 is a plan view of the device. Fig. 2 is an elevation of the right-hand side of the device as shown in Fig.
1. Fig. 3 is a plan view of the base and attached parts. Fig. 4 is a vertical section through substantially one-half of the device on line 4 4 of Figs. 1 and 5. Fig. 5 is a vertical section on the curved line 5 5 of Fig. 3.
Fig. 6 is a vertical transverse section of the knife. Fig. 7 is a plan view of the scales and the parts on which they are placed, parts being broken away. Fig. 8 is a perspective view of the cover for the cut face of the cheese.

In detail there is first made a base portion comprising the circular piece 10, with three inwardly-extending arms 11, that form a spider having a central bearing portion with a hole 12 in it. At the outer ends of said arms 11 there are downwardly-extending legs 13 and also upwardly-extending bearing-points 14, which support the cheese-board 15. This board has a central downwardly-extending bearing-pin 16, that extends through the hole 12 in the spider of the base below. In this manner the cheese is mounted concentric with the base and pivoted so as to be rotated. The upper side of the cheese-board has on it at intervals upwardly-extending blades or plates 17, that act as cheese-holders, as they hold the cheese on the board, so that the board and cheese will not move separately and will rotate together. These plates 17 have down- wardly-projecting spurs that are driven into the board for holding the plate in place. Upon the cheese-board I also provide a series of lines 18, that are concentric with the center of the cheese-board to enable one to place the cheese upon this board also concentric with the center of the board. This is required to insure equal weight of cuts of the same thickness.

The cutting mechanism is as follows: Arms 20, extending from the rear side of the base, with the cross-bar 21 secured to them, make a bearing-frame for pivoting a knife-bar 22. The knife-bar has at its rear end a transversely-extending portion 23, the ends of which are pivotally engaged by adjustable bearing-pins 24, extending through the rear upper portion of the arms 20. The knife-bar at its outer end has a handle, and about midway the knife 25 is secured to said bar. This knife consists of a blade the rear end of which extends beyond the cheese-board and the other end to exactly the center of the cheese-board, so that it will cut to the center of the cheese and no farther, and the slices cut from the center of the cheese will always be sectoral. In order that said knife will cut easily and true, it is beveled along its cutting edge at the point 26 on the side opposite the body of the cheese from which the slice is being cut, or the beveled edge is on the same side of the knife as the slice that is being cut and pushes said slice laterally to the left in the machine herein shown. In order that the knife shall not be in frictional contact throughout its entire surface with the body of the cheese from which a slice is being cut so as materially to increase the difficulty of cutting the cheese, I grind down the side of the knife next to the body of the cheese, or right-hand side in the form herein shown, or, what is the same thing, I form the knife with the portion 27 just above the cutting edge thicker than the portion above, so the body of the blade will clear the cheese. The side of the lower edge of the knife next to the cheese being cut is vertical and in no wise beveled.

The means for rotating the cheese-board, and therefore the cheese, will now be explained.

From the base portion a pair of arms 30 extend out a short distance parallel with each other. Near these arms there is a U-shaped guideway 31, secured to and concentric with the circular base-piece 10. Extending transversely and radially across this U-shaped guideway near bottom there is mounted a shaft 32, carrying on its outer end a small hand-lever 33. On said shaft, within the guideway, a peculiarly-shaped cam 34 is secured. Within said guideway there is a U-shaped slide 40, fitting loosely with one end adjacent said cam 34 and held adjacent thereto by a spring 41, which is attached to the left-hand end of the slide, as seen in Fig. 5, and also to the inner wall of the guide 31. Within said slide I mount a number of pawls 42, there being four shown here, that extend upwardly and to the right and are held upward by the springs 43 in engagement with a rack 44, secured to the under side of the cheese-board 15 and extending entirely around the same. When the hand-lever 33, as shown in Fig. 3, is thrown upward, it will, through the shaft 32 and the cam 34, move the slide 40 to the right and one of the pawls in said slide will move the cheese-board. When the hand-lever 33 is thrown backward in the position seen in Fig. 2, the cam will be thrown upward in the position shown in Fig. 5 and the spring 41 will withdraw the slide 40 to its normal position. The operation of the lever 33 is repeated for every slice to be cut. I show four pawls so arranged relatively that at least one of them will always be in immediate actuating engagement with a notch in the rack-bar 44, and thus all lost movement of the cheese-board will be prevented.

The weight and price mechanism will now be described. To the ends of the arms 30, heretofore described, there is secured a substantially semicircular bar 50, that is adjacent the lever 33 during the movements of the latter. On said bar 50 I place a scale or series of numerals 51, that indicate the customary weights of individual cheeses. On said bar 50 I place a stop-block 53, that is slidable and is secured or clamped to it at any desired point by thumb-screw 54. This block 53 stops or limits the movement of the hand-lever 33, and thus limits the rotary movement of the cheese. I secure rigidly to said block 53 a plate 55 alongside and curved in the same manner as the upper portion of the bar 50. Upon this plate I place a scale of numerals 56, indicating the selling price per pound of cheeses of varying quality.

The device is operated as follows: The stop-block 53 is moved on bar 50 so that the price of the cheese in one scale will register with the total weight of the cheese in the other scale. This will leave the stop-block in a position which will limit the movement of the lever 33 so that the cam will move sufficiently far at each stroke to slice off, say, five cents' worth. When the stop-block is thus set for a cheese, it is not changed until that cheese is sold and a different cheese placed upon the board. If a person wants ten cents' worth of cheese, the lever 33 is actuated twice before the knife is operated.

The scales on the bar 50 and plate 55 are logarithmic scales, and therefore relatively fixed and definite. The numerals indicating the selling price may be upon the bar 50, and the numerals indicating the total weights of the cheeses may be upon the plate 55—that is, interchanged as compared with said scales in Fig. 7. In other words, it is immaterial which of said series of numerals is placed upon the bar and which upon the plate. Since it is more convenient to have the plate 55 secured to the stop 53, so as to move therewith, it is necessary to reverse the series of numerals, as shown in Fig. 7, as is common in logarithmic scales; but if the stop 53 be not connected with the plate 55 the series of numerals need not be reversed, but may be arranged as in the common forms of logarithmic scales. In such case the stop 53 is moved to the product of the corresponding numerals on the scales, as indicated in any common form of said scales. Therefore I do not wish to be limited to a device of the kind herein set forth, where the series of numerals are reversed or where stop 53 is secured to the means for carrying one of the scales, for the other form just alluded to will occur at once to any person familiar with logarithmic scales.

I am aware that logarithmic scales have been used by persons making cheese-cutters, but only in the manner that one uses a table in an arithmetic—that is, only for reference from which a third scale may be made for indicating the location of the stop 53. In my machine I dispense with the third scale by using a logarithmic cam, such as 34, that enables me to place the price-scale and the weight-scale in logarithmic form immediately adjacent said stop 53 or lever 33 to indicate immediately and at once without any further scale the proper location for the stop 53. I am enabled to accomplish this result by using a logarithmic cam the actuating-surface of which conforms to what is known as a "logarithmic spiral," whereby what may be called a "logarithmic movement" of the shaft 32 is converted into the equivalent of simple rotary movement or such as results from the use of a circular pinion with a pinion or similar means in place of the cam to move the cheese-board, or with a cam the actuating-surface of which is not a logarithmic spiral a third scale or means for indicating the proper location of the stop would have to be provided.

While the cam is a logarithmic cam, its size so as to properly actuate the cheese-board is determined for convenience as follows: Assuming the scales to be as shown, the price being twenty cents per pound and the cheese weighing eighteen pounds, the total selling price of the cheese would be three dollars and sixty cents, which would make seventy-two five-cent slices. The cam is then made of such size that it will move the cheese-board five degrees at one stroke of the lever 33, so that seventy-two strokes or movements of the cheese-board will turn the board entirely around once and cut away all the cheese. With the cam thus formed for measuring five-cent slices in an eighteen-pound cheese at twenty cents per pound the logarithmic scales will enable one to adjust the stop to any other combination of price and weight, and the slices through the mechanism described will be relatively larger or smaller, as the case may be; but they will still be five-cent slices. Any constant may be employed in determining the shape of the logarithmic cam or spiral as desired.

After a slice has been cut from the cheese it is necessary to cover or protect the cut face that is not protected by the knife; otherwise the cheese would dry and harden. This is done by the means shown in Fig. 8. A tin plate 60 is placed against the cut face of the cheese with the flange 61 under the cheese. A movable plate 62 is placed against the cut face of the cheese and the teeth 63 are forced into the top side of the cheese. This holds the plate 62 in place, and the plate 62 holds the upper part of the plate 60 in place, and the flange holds the lower part of the plate 60 in place.

By a "logarithmic scale" in the description and claims is meant a scale constructed in accordance with what is known in mathematics as a "logarithmic spiral," and by "logarithmic cam" is meant a cam the actuating face or edge of which is in the form of what is known in mathematics as a "logarithmic curve."

What I claim as my invention, and desire to secure by Letters Patent, is—

1. In a cheese-cutter, the combination with a movable cheese-board, and means for moving the cheese-board, of an adjustable stop for limiting the movement of the cheese-board, and logarithmic scales adjacent said stop for indicating the desired position thereof, one of said scales being connected and movable with said stop.

2. In a cheese-cutter, the combination with a movable cheese-board, and means for moving the cheese-board, of a stop for limiting such movement, a bar on which said stop is slidable and adjustable, a plate connected with the stop and held adjacent said bar, and scales on said bar and plate adapted to register with each other for indicating the desired position of the stop.

3. In a cheese-cutter, the combination with a movable cheese-board, and means for moving the cheese-board, of a stop for limiting such movement, a bar on which said stop is slidable and adjustable, a plate connected with the stop and held adjacent said bar, and logarithmic scales on said bar and plate adapted to register with each other for indicating the desired position of the stop.

4. In a cheese-cutter, the combination with a movable cheese-board, of a logarithmic cam for causing the movement of the cheese-board, means for limiting the movement of said cam, and logarithmic scales for indicating the desired position of said limiting means.

5. In a cheese-cutter, the combination with a rotary cheese-board, of a logarithmic cam for causing the movement of the cheese-board, an adjustable stop for limiting the movement of the cam, and logarithmic scales for indicating the desired position of said stop.

6. In a cheese-cutter, the combination with a rotary cheese-board, of means for moving said cheese-board, a logarithmic cam for actuating said means, a stop for limiting the movement of said cam, and logarithmic scales for indicating the position thereof.

7. In a cheese-cutter, the combination with a rotary cheese-board, of an annular ratchet-bar on the under side of said board, a spring-withheld slide beneath said ratchet-bar, a spring-pawl mounted in said slide that engages and actuates said ratchet-bar and moves the cheese-board, a logarithmic cam for engaging and actuating said slide, an adjustable stop for limiting the movement of said cam, and logarithmic scales adjacent said stop for indicating the desired position thereof.

8. In a cheese-cutter, the combination with a rotary cheese-board, of an annular ratchet-bar on the under side of said board, a spring-withheld slide beneath said ratchet-bar, spring-pawls mounted in said slide that engage and actuate said ratchet-bar to move the cheese-board, and means for actuating said slide.

9. In a cheese-cutter, the combination with a rotary cheese-board, of an annular ratchet-bar on the under side of said board, a spring-withheld slide beneath said ratchet-bar, spring-pawls mounted in said slide that engage and actuate said ratchet-bar to move the cheese-board, the actuating-point of said pawls being separated from each other by a distance slightly greater than the distance between two of the notches of said ratchet-bar, and means for actuating said slide.

10. In a cheese-cutter, the combination with the base and a cheese-board mounted to rotate thereon, of an annular ratchet-bar on the under side of said board, a guide-bar secured to the base and curved concentric with the ratchet-bar, a spring-withheld slide mounted on said guide-bar that is also concentric with the cheese-board, spring-actuated pawls mounted in said slide that engage and actuate said ratchet-bar to move the cheese-board, and means for actuating said slide.

11. In a cheese-cutter, the combination of a base and a rotary cheese-board, an annular ratchet-bar on the other side of said board, a guide secured to the base and concentric with the center of the cheese-board, a spring-withheld slide mounted on said guideway, a spring-pawl on said slide that engages and actuates the ratchet-bar to move the cheese-board, a shaft extending through said guide, a cam on said shaft for engaging the slide and actuating it, a hand-lever on the outer end of said shaft, a bar adjacent which said lever moves, an adjustable stop mounted on said bar to limit the movement of the lever, a plate secured to said stop and adjacent said bar, and a scale on said bar and plate for indicating the desired position of the stop.

In witness whereof I have hereunto affixed my signature in the presence of the witnesses herein named.

ROBERT P. KING.

Witnesses:
V. H. LOCKWOOD,
NELLIE ALLEMONG.